No. 648,369. Patented Apr. 24, 1900.
F. B. PARKS.
PNEUMATIC TIRE.
(Application filed July 24, 1899.)
(No Model.)

Witnesses.

Inventor.

Fred B. Parks.

By Ithiel J. Cilley
Attorney.

UNITED STATES PATENT OFFICE.

FRED B. PARKS, OF GRAND RAPIDS, MICHIGAN.

PNEUMATIC TIRE.

SPECIFICATION forming part of Letters Patent No. 648,369, dated April 24, 1900.

Application filed July 24, 1899. Serial No. 724,997. (No model.)

*To all whom it may concern:*

Be it known that I, FRED B. PARKS, a citizen of the United States, residing at Grand Rapids, in the county of Kent and State of Michigan, have invented certain new and useful Improvements in Pneumatic Tires, of which the following is a specification.

My invention relates to improvements in pneumatic tires; and its objects are, first, to render the tire practically puncture-proof, and, second, to facilitate the use and proper distribution of a semiliquid rubber preservative within the tire. I attain these objects by the construction illustrated in the accompanying drawings, in which—

Figure 1:
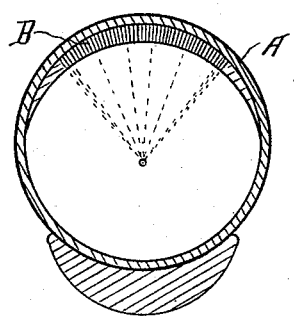
Figure 2:
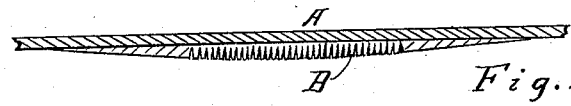

Figure 1 is a cross-section of a tire, showing the construction of the inner layer of rubber; and Fig. 2 is the same extended to show the manner of constructing this inner surface of the tire.

Similar letters refer to similar parts throughout both the views.

In the construction of this tire the outer surface A should be made of the best tire-rubber properly vulcanized to meet all of the requirements of the best pneumatic tires. Back of this should be placed the supporting-canvas and inner coating of rubber, and back of this I place a thickness of semivulcanized rubber B about one-fourth to three-eighths of an inch thick. This inner coating of rubber is serrated longitudinally or circumferentially of the tire, as indicated in Fig. 2, in such a manner that when the tire is formed the lines of serration will describe a part of the radial lines of the tube that forms the tire, as indicated by the dotted lines in Fig. 1, and the projecting laminations of rubber will be closely pressed together, so that air cannot be forced through between them even though the outer layer of the tire is punctured. The object of making this inner coating of rubber soft and elastic is twofold. First, if the tire is punctured the puncturing object will not be likely to break through the rubber, in consequence of its elastic qualities, and, second, the pressure of the air within the tire will always tend to pack this soft rubber and fill any puncture that may have been made through it. The object of serrating this rubber is to lessen the danger of an open puncture through it. With this rubber solid or in one piece the puncturing object might be forced through; but with it serrated to form thin laminations closely packed together the elastic nature of the rubber would cause it to stretch and guide the puncturing object to one side of and between the laminations rather than directly through, and the rebound or return of the rubber to its normal position will entirely close a puncture that would otherwise allow all of the air in the tire to escape. I place this soft rubber directly adjacent to the tread of the tire only, as this is the only portion of the tire that is liable to be punctured. It will be readily seen that with this construction any liquid or semiliquid rubber preservative that may be introduced into the tire will readily incorporate itself with the laminations of rubber in such a manner as to prevent the decarbonization of the rubber by atmospheric contact.

Having thus fully described my invention, what I claim as new, and desire to secure by Letters Patent, is—

In combination with a pneumatic tire, an inner coating of soft rubber serrated circumferentially of the tire to form laminations the dividing-lines of which are upon the radial lines of the tube that forms the tire, and in position to press the laminations closely together when the tire is formed and inflated, substantially as and for the purpose set forth.

Signed at Grand Rapids, Michigan, July 21, 1899.

FRED B. PARKS.

In presence of—
ESTELLA CILLEY,
ITHIEL J. CILLEY.